UNITED STATES PATENT OFFICE.

HAMLET WEBSTER BELKNAP, OF BRADFORD, NEW HAMPSHIRE, ASSIGNOR, BY MESNE ASSIGNMENTS, TO HIMSELF AND HENRY C. BARTLETT, OF SAME PLACE, AND JOSEPH A. HARTSHORN, OF BOSTON, MASS.

COMPOSITION FOR LUBRICATING METALLIC SURFACES.

SPECIFICATION forming part of Letters Patent No. 317,490, dated May 12, 1885.

Application filed March 19, 1885. (No specimens.)

*To all whom it may concern:*

Be it known that I, HAMLET WEBSTER BELKNAP, of Bradford, in the county of Merrimack, of the State of New Hampshire, have invented a new and useful Improvement in Compositions for Lubricating Metallic Surfaces; and I do hereby declare the same to be described as follows.

The composition constituting my invention has the following constituents, in or about the proportions as set forth, viz: One gallon of the petroleum or mineral oil extensively known in commerce by the term "500 A Oil," one pound of "graphite," "black-lead," or "plumbago," in a finely-powdered state, one quarter of a pound of paraffine-wax, one pound of tallow, and one-quarter of a pound of finely-powdered sulphur or "flowers of sulphur."

In manufacturing the said composition the mineral oil is first to be heated to a temperature of 150° Fahrenheit, or thereabout, after which, and while the oil is at such temperature, the plumbago, in the state of an impalpable powder, and the paraffine-wax heated to a temperature of 180° Fahrenheit, or thereabout, are to be added to the mixture of oil and plumbago, and should be well stirred or incorporated therewith. Next the tallow heated to a temperature of 150° Fahrenheit, and the sulphur, in mixture therewith or otherwise, are to be added to the other ingredients, and the whole should be thoroughly stirred and heated to a temperature of 160° Fahrenheit, after which the composition is to be slowly cooled or reduced to 140° Fahrenheit, or thereabout, when the composition, in a state of paste, will be ready for use, or of being packed in suitable boxes, pots, or vessels, for preservation and sale, and for use as occasion may require.

The oil is a heavy lubricator and does not readily gum or lose its liquidity when in use with the other ingredients, and while the plumbago is an anti-friction material, the sulphur, in connection therewith, operates to prevent heating of bearings when the composition is in use thereon. The tallow is to solidify the composition or reduce it to the form of a paste.

In using the above composition it is to be spread on the surface or surfaces to be lubricated. I do not confine its ingredients to the precise proportions as stated, as in some cases they may be varied more or less without changing the character of the composition.

What I claim, and desire to secure by Letters Patent of the United States of America, is—

The herein-described composition of matters to be used for lubricating purposes, it consisting of the petroleum or mineral oil termed in commerce "500 A Oil," graphite, or plumbago, paraffine-wax, tallow, and sulphur, combined or mixed in or about in the proportions as set forth.

HAMLET WEBSTER BELKNAP.

Witnesses:
MASON W. TAPPAN,
CHARLES F. JAMESON.